United States Patent [19]
Val

[11] 3,822,764
[45] July 9, 1974

[54] STRUCTURAL ELEMENTS HAVING HIGHLY IMPROVED SOUNDPROOFING CHARACTERISTICS

[75] Inventor: Marcel Marie Antoine Val, Clermont-De-L'Oise, France

[73] Assignee: Saint-Gobain Industries, Neuilly-Sur-Seine, France

[22] Filed: Sept. 22, 1972

[21] Appl. No.: 291,190

[30] Foreign Application Priority Data
Nov. 25, 1971 France.............................. 71.42221
July 20, 1972 France.............................. 72.26130

[52] U.S. Cl............................. 181/33 G, 161/156
[51] Int. Cl........................................... E04b 1/84
[58] Field of Search........ 181/33 G, 33 GA; 161/41, 161/196, 216, 219, 250, 181, DIG. 4, 156

[56] References Cited
UNITED STATES PATENTS

| | | |
|---|---|---|
| 1,883,486 | 10/1932 | Beckwith................. 181/33 GA UX |
| 2,097,595 | 11/1937 | Malcolm........................... 161/80 X |
| 2,757,116 | 7/1956 | Clements........................ 161/196 X |
| 3,185,297 | 5/1965 | Rutledge..................... 181/33 G UX |
| 3,216,167 | 11/1965 | Roberts et al............. 181/33 G UX |
| 3,352,742 | 11/1967 | Zunich et al.................... 161/216 X |
| 3,455,775 | 7/1969 | Pohl et al............................ 161/216 |
| 3,542,638 | 11/1970 | Kenny........................... 181/33 G X |
| 3,557,263 | 1/1971 | Marra .......................... 161/161 UX |
| 3,616,162 | 10/1971 | Noziere........................... 161/161 X |
| 3,658,633 | 4/1972 | Jumentier et al.......... 181/33 GA X |

OTHER PUBLICATIONS
Pohl, K. H. and Spencer, A. T., New Structural Laminate: Polyethylene Core, Aluminum Skins, in Modern Plastics. March, 1964, pp. 119–123.

*Primary Examiner*—Richard B. Wilkinson
*Assistant Examiner*—John F. Gonzales
*Attorney, Agent, or Firm*—Samuel Lebwitz

[57] ABSTRACT

Structural elements exhibiting extraordinary soundproofing characteristics comprised of two rigid layers with an intermediate layer of resilient material integrated in composite unitary mass wherein the thickness of the layers, their modulii of elasticity and shear, as well as physical properties, are critically interrelated to impose sound-deadening effects therethrough. Such structural elements are especially effective when used as facings for insulating elements of fibrous, porous or cellular materials, especially where such are applied to the opposite side of the latter, in which case the resulting insulating assemblies present many advantageous features in the fields of building constructions and other industrial locales.

39 Claims, 28 Drawing Figures

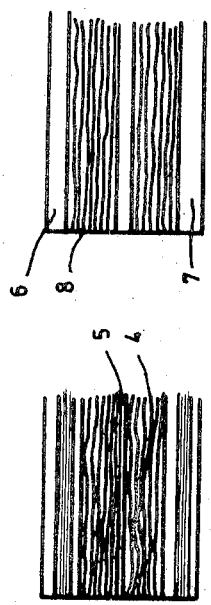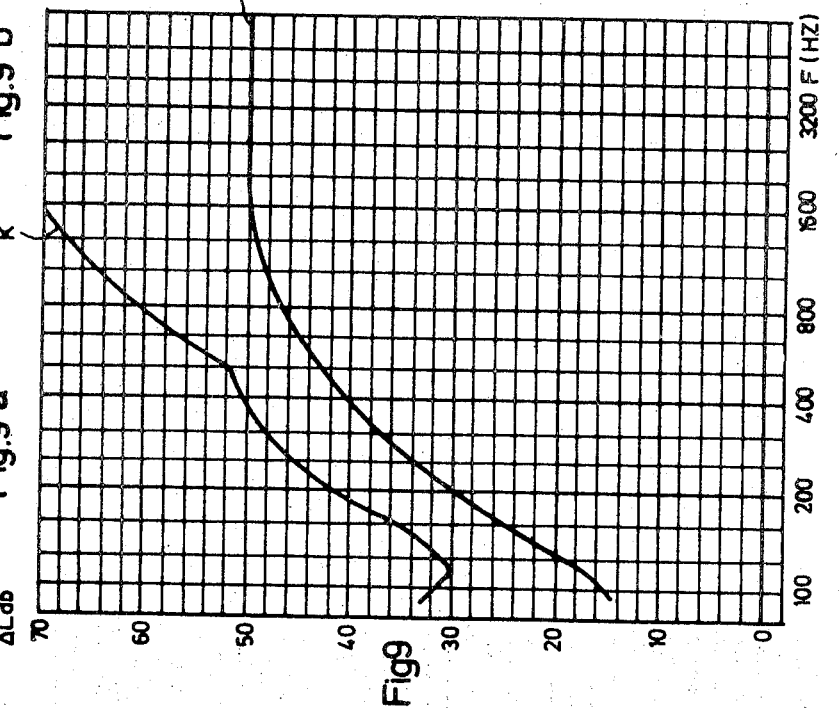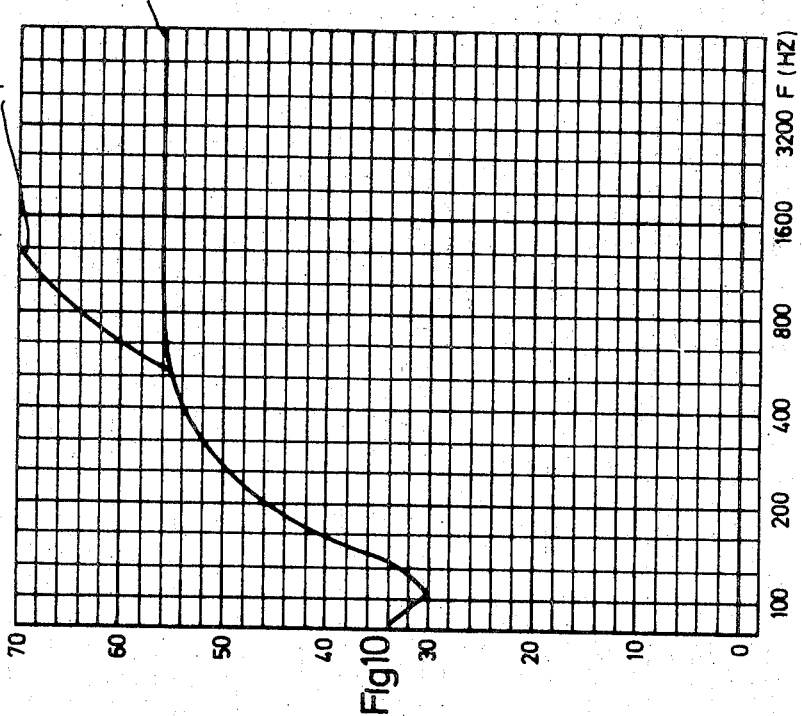

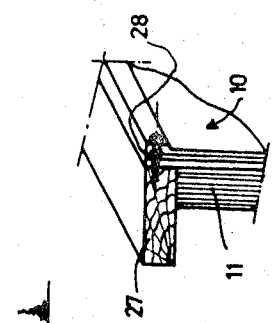
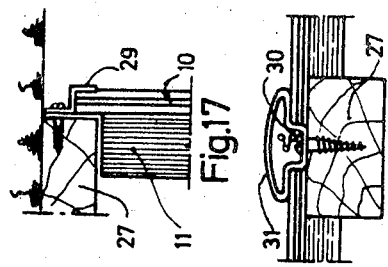
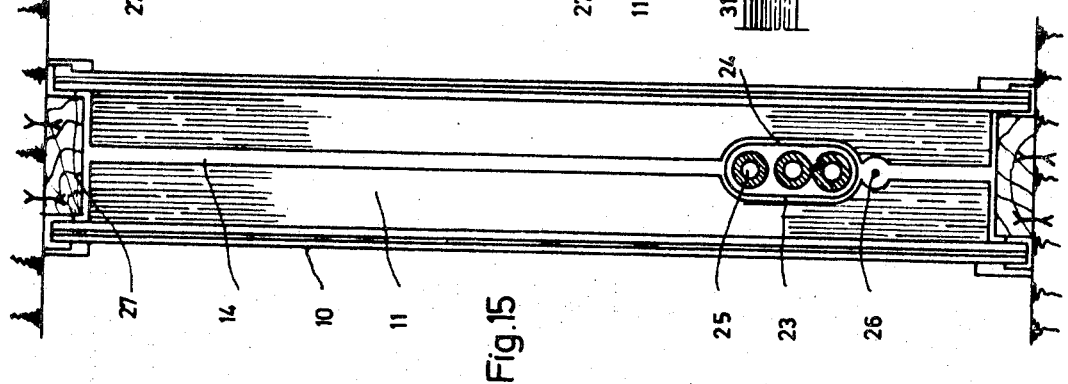
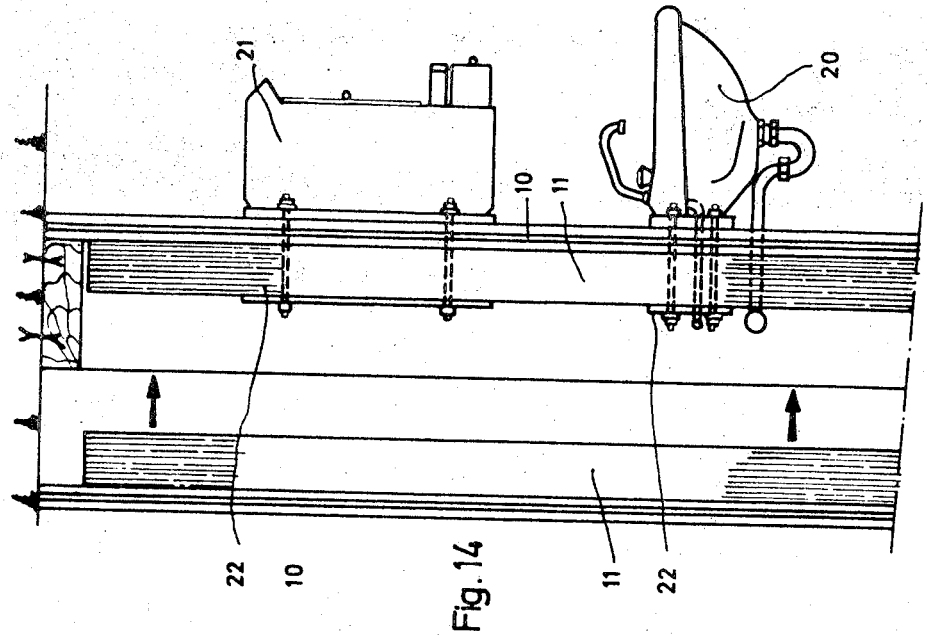

3,822,764

STRUCTURAL ELEMENTS HAVING HIGHLY IMPROVED SOUNDPROOFING CHARACTERISTICS

The present invention relates to structural elements such as wall facings, which are particularly useful for partitions, which are endowed with excellent soundproofing qualities. In addition, when such structural elements are combined with masses, slabs or panels of insulating bodies of fibrous, porous or cellular materials, the acoustic insulating effects of the resulting composite structures are enhanced to an extraordinary degree.

The invention is concerned particularly with structural elements, such as facings, comprised of two rigid plates separated by an intermediate layer. It is the object of the invention to attain such composite structures, which may be used for facings or in many other industrial applications, and which are characterized by highly improved acoustic insulating characteristics over known structures of this type of substantially identical surface weights.

It is another object of the invention to provide a new industrial product, especially useful in building constructions, characterized by high soundproofing qualities, this novel product being constituted by associating the structural element in accordance with the present invention with an insulating element of fibrous, porous, or cellular materials. After repeated tests, it has been established that the structural element in accordance with the invention, which may be designated a facing, when combined with the insulating element of fibrous, porous, or cellular material, results in an interaction which endows the resulting structural products with particularly high acoustic insulating characteristics.

The composite structural elements in accordance with the invention may advantageously be constituted by an insulating element, on each surface of which is provided a facing.

According to one embodiment of the invention, the insulating element adheres directly to the facing, said facing being formed directly on the insulation by a wet process or by casting.

According to another embodiment of the invention, the insulating element is affixed to the facing through the intermediary of adhesive means.

According to another characteristic of the invention, the insulating element is constituted by two elements separated by an air layer, said elements being kept separated by spacing blocks or studs.

According to another characteristic of the invention, the composite structural element is attained in the form of two semi-partitions, each comprising a facing associated with an insulating panel, the assembly being maintained by a framework. The invention also contemplates that the space left free between the two insulating elements, be used to establish air circulation and/or to accommodate pipes.

The invention provides in a general way for the use of any fibrous, porous, or cellular materials for the formation of the insulating element.

According to one particularly advantageous mode of execution of the invention, the insulating element is formed of polystyrene foams of low density, in particular, of the order of 5 kg. to 6 kg. per cubic meter. This results in partitions with facings according to the invention which, while being of small thickness, present particularly remarkable qualities of acoustic insulation.

These polystyrene foams may be produced in accordance with the process disclosed in French Patent No. 1,440,106, to Compagnie de Saint-Gobain, and U.S. Pat. No. 3,616,162, Oct. 26, 1971. This process consists of reheating expanded pearls of polystyrene to the softening temperature and then subjecting the layer of pearls to compression, to give the material the desired thickness and density, said material being then cooled while subjecting it to sufficient pressure to maintain its thickness. The preexpanded beads of polystyrene which are utilized as basic material in this process, may advantageously be those which are disclosed in the French patents to Compagnie de Saint-Gobain Nos. 1,440,075 and 1,440,076, and U.S. Pat. No. 3,631,133, Dec. 28, 1971, corresponding to the latter. These expanded beads present the characteristics of having an apparent specific mass of the order of 5 kg. per cubic meter or lower. They may be obtained by the processes of said patents, according to which the polystyrene granules containing a blowing agent are first preexpanded at atmospheric pressure by subjecting them to a steam treatment, followed by conditioning and another steam treatment in an autoclave. They also may be obtained by pre-expanding the polystyrene granules containing a blowing agent by heating at a temperature above 90°C. to 100°C., which is followed by a steam treatment.

The insulating element constituted by these cellular products of polystyrene foams may be fabricated according to the process disclosed in French Patent No. 1,565,479, which was filed Feb. 6, 1968 by the assignee of the instant invention, wherein the product constituted of polystyrene foam is subjected to a pressure treatment followed by a steam treatment.

In another embodiment of the invention, the insulating element is constituted by a mat or pad formed of mineral fibers agglomerated by a binder. These mineral fibers may be glass, rock, or slag fibers. They may have a diameter of less than 20 microns, and particularly between 4 and 12 microns. The binder is preferably of an organic composition, which may advantageously be of the phenolformaldehyde type. The proportion of binder may be between 5 and 15 percent. The invention contemplates the provision of plates formed of a network of bonded fibers in which are incorporated indeformable particles, such as grains of sand, crushed glass, or crushed rocks, as well as particles of cellular mineral materials, such as perlite and vermiculite, in particular. Such plates and their method of production are disclosed in U.S. Pat. No. 3,616,030, Oct. 26, 1971.

Other objects and purposes of the invention, and preferred modes of realization of such, will appear from the following description thereof, taken in conjunction with the accompanying drawings, wherein FIG. 1 is a schematic sectional view of a structural element in accordance with the invention, comprised of two rigid plates separated by an intermediate layer;

FIG. 6 is a graph of comparative curves portraying the acoustic improvements attainable by applying on the opposite sides of an insulating slab facings in accordance with the invention, as shown in FIG. 6a;

FIG. 9 is a graph of comparative curves similar to FIG. 8 when the insulating assemblies of the same thickness are provided with the inventive structural facing and unitary facings of agglomerated wood particles, as shown in FIGS. 9a and 9b, respectively;

FIG. 10 is a graph of comparative curves similar to FIG. 7 when the insulating assemblies comprise a polystyrene core of low density, to the opposite faces of which are applied the inventive structural facings and unitary facings of plaster, as shown in FIGS. 10a and 10b, respectively;

FIGS. 12 to 15 are sectional views of different arrangements of the assembly shown in FIG. 11 in its finally installed position, and illustrating different air-insulating, ventilating, fixture-mounting and conduit-housing expedients; and FIGS. 16 to 18 are detailed views of finishing trim arrangements for mounting the assemblies in accordance with the invention in their supporting frames.

Figure 1:
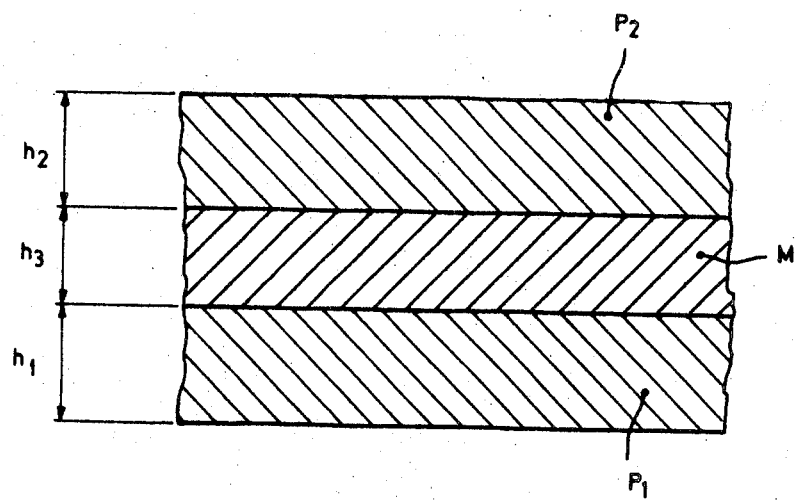

In the schematic illustration of the composite structure shown in FIG. 1, the plates $P_1$ and $P_2$, having a thickness $h_1$ and $h_2$, respectively, are homogeneous and of good elasticity characteristics. The Young's modulus of the materials employed in a fabrication of these plates may be characterized by the complex designations $E_1^*$ and $E_2^*$, respectively, where $E^* = E(1 + in)$, E representing the modulus of elasticity of the material, or Young's modulus, n representing the deadening coefficient, and their densities being represented by $P_1$ and $P_2$, respectively. On the other hand, the intermediate layer M in this assembly is provided with an adhesive suitably applied to its opposite faces, which effects a mechanical bonding between the two plates $P_1$ and $P_2$. The properties of this intermediate layer are determined by its Young's modulus $E_3$, its shear modulus $G_3$, its thickness $h_3$ and its density $P_3$.

As stated above, structural elements of these characteristics, when composited as indicated in FIG. 1, exhibit greatly improved acoustic insulating properties in comparison with similar known structures of comparable surface weights. For this purpose, the structural elements fulfill the following conditions:

a. the Young's modulus, or modulus of elasticity, of the intermediate layer M is lower than that of plates $P_1$, $P_2$;

b. the thickness $h_1$ and $h_2$, measured in meters, of plates $P_1$, $P_2$ are less than $15/C_L$ and preferably close to $10/C_L$, $C_L$ representing the speed, measured in meters per second of the longitudinal waves in the materials constituting said plates;

c. the thickness $h_3$ of the intermediate layer is less than or equal to 15 mm.; and d. the shear modulus of the composite structure is at least equal to that of the intermediate layer.

Such a design of the structural element in accordance with the invention makes possible, on the one hand, shifting the critical frequency $f_c$ towards the high frequencies, beyond the standard spectrum, and on the other hand, assuring that the resonance frequency $f_r$ is as low as possible. Thereby are avoided the effects arising from the coincidence zone, or the "insulation drop" corresponding to the resonance frequency, and also there is obtained a curve of increased sound insulation as a function of the frequency, presenting a higher slope following the resonance frequency.

The above-mentioned condition (a) effects the uncoupling between plates $P_1$, $P_2$, whose critical frequency controls the critical frequency $f_c$ of the assembly. This decoupling allows said critical frequency $f_c$ to be shifted towards the high frequencies. Preferably, the Young's modulus of the intermediate layer M is at least ten times lower than that of these plates.

The conditions according to (b) above, is itself determined as a function of the frequency $f_c$. For example, assuming a value greater than 6000 HZ, for the critical frequency $f_c$, the thickness of plate $h_1$ is approximately $10/C_L$.

In order to increase the sound transmission loss of the structure, an additional reduction of energy is achieved by shear effect in the intermediate layer M, it being noted that the thickness of this layer cannot exceed a limit, since beyond that, the deformation due to shear effect become negligible. Experience shows that this thickness should be less than 15 mm., which is the condition specified in (c) above.

The condition under (d) above is satisfied by using a suitable assembling method to effect the adhesion between the intermediate layer M and plates $P_1$, $P_2$. This condition is fulfilled in the case of casting of plaster plates on the intermediate layer. If it is necessary to utilize an adhesive material, the latter is preferably applied over the entire surface. The invention also contemplates the use of studs or plugs between the plates to improve the mechanical interconnection of the latter.

According to another characteristic of the invention, use is made of an intermediate layer having a shear modulus $G_3$, which is high and exceeds its Young's modulus $E_3$, the relation between these two modulii being $G_3/E_3 \geq 10$.

It is another characteristic of the invention that preferably the intermediate layer have high resistance to flow, greater than 20 Rayleigh, and preferably equal to or higher than 60 Rayleigh. It is recalled that the Rayleigh unit is a measure of resistance to flow presented by a sample having a section of one square centimeter which is subjected to a pressure difference of 1 dyne per square centimeter when it is traversed by a flow of air of 1 cubic centimeter per second.

According to another embodiment of the invention, it is advantageous for the thicknesses $h_1$ and $h_2$ to be such that they satisfy the relation $\rho_1 h_1 = \rho_2 h_2$ which, for plates made of the same materials, results in the use of symmetrical structures. This relationship $\rho_1 h_1 = \rho_2 h_2$ also contributes to attaining as low a resonance frequency $f_r$, as possible.

All suitable materials may be used to form the plates, for example, plaster, agglomerates of particles of wood, metals, etc., the choice of these materials being generally dictated by the intended applications. It is particularly advantageous to use plaster, for the reason that plaster, when poured over the intermediate layer, adheres to it without having to use any adhesive material. In addition, the plaster may contain an addition of sand in a substantial amount, which may be of the order of 40 percent.

For the materials of the intermediate layer, organic or inorganic fibrous materials may be used, or a mixture of such materials. In particular, glass fibers may be used. Advantageously mats or pads of glass fibers may be used, of the type described in U.S. Pat. No. 3,658,633, Apr. 25, 1972. These are constituted of glass fibers whose length is at least of the order of a decimeter and whose diameter is between about 10 to 40 microns, these fibers being entangled in parallel planes and bonded by one or more elastomers constituted by natural or artificial latex in which are incorporated one or more adjuvants, the percentage in weight of the binder being between 20 and 50 percent of the total weight of the mat. When mats of this type are used for the intermediate layers, to be glued to the outer layers, filling layers are applied to the outer surfaces thereof which partially or completely block the pores thereat and the migration of the adhesive into the interior of the mat, as described in said patent filed May 14, 1968.

The intermediate layer of the instant invention may also be of the type disclosed in the application for patent of B. M. J. Proucelle, "Manufacture of Products Having High Acoustic Insulating Characteristics," Ser. No. 271,667 filed July 14, 1972, and assigned to the same assignee as the instant application. The mats disclosed in this application are formed of mineral or organic fibers, particularly glass fibers, expanded in a thermoplastic resin foam in particular, a polyvinyl resin such as plasticized polyvinyl chloride.

It may also be advantageous to needle the intermediate layer formed of mats of glass fiber by means of organic fibers.

The intermediate layer may also be formed of cellular materials, for example, of expanded foams of resins, such as polyvinyl chloride, polyurethane, etc. Plugs or studs of rigid materials may be provided in the intermediate layer, which may be the same as those formed in the plates, and which can be an integral part of the latter, to improve the interconnection between the layers.

Below are two examples of structural elements or facings in accordance with the invention:

EXAMPLE 1

A first plate is formed, 5 mm. thick, from a commercial plaster, the plaster mix (80% plastic, 20% water) being poured into a mold. An intermediate layer of a thickness of 3 mm. is positioned on the cast plate before it has completely set, and this layer is of the type described in the first patent mentioned above, U.S. Pat. No. 3,658,633. This layer has a weight of 300 grams per square meter and the binder is an emulsion of latex whose percentage by weight is 30 percent of the total weight. This intermediate layer adheres to the plaster of the first plate. The second plate, constituted the same as the first, is poured on the intermediate layer in the same thickness as the first. The resulting product can undergo a normal drying or be put into an oven.

Figure 2:
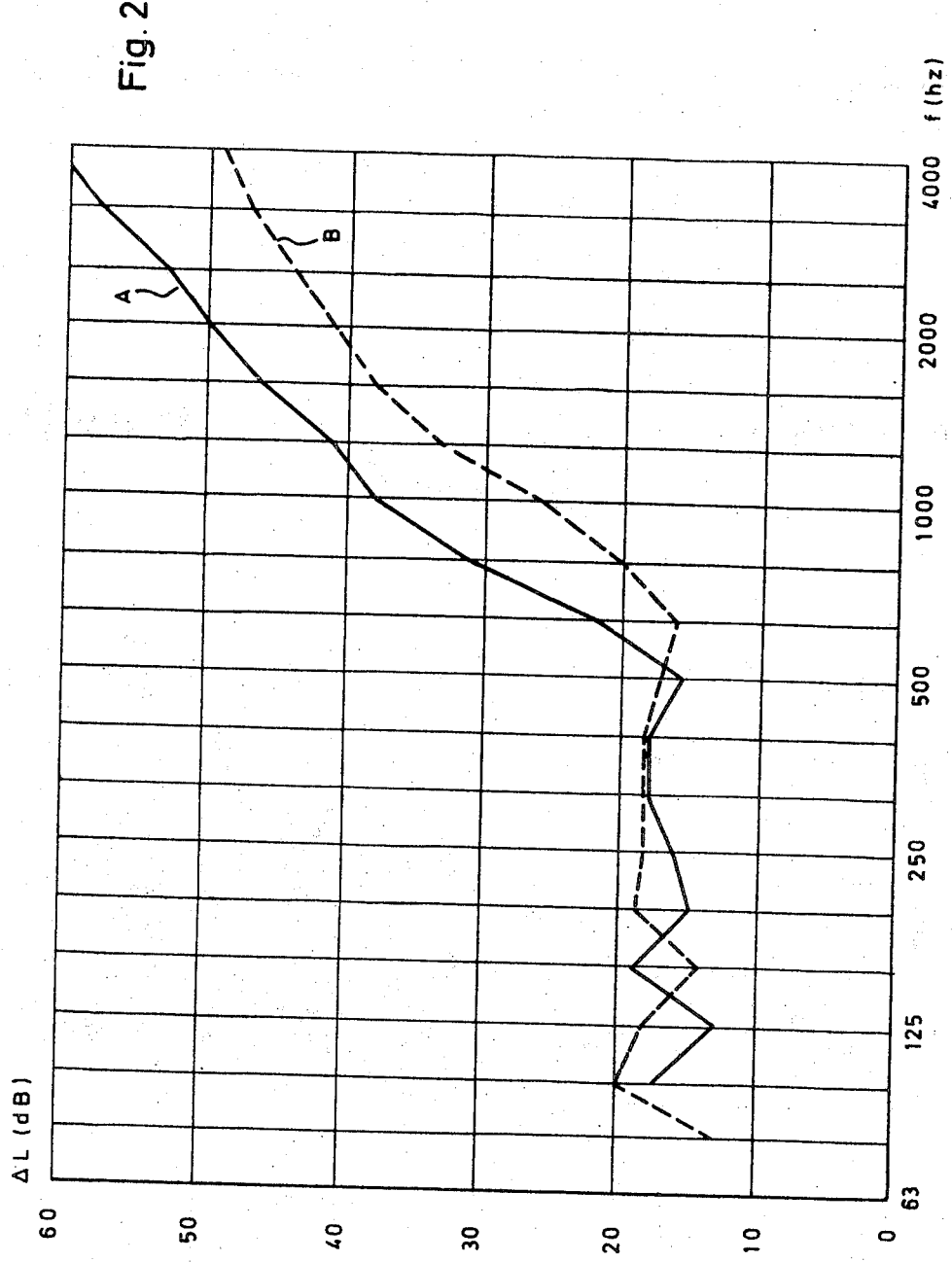
FIG. 2 is a graph portraying curves of soundproofing characteristics of such structural elements as are shown in FIG. 1 when the outer plates are of different compositions.

Curve A in the graph of FIG. 2 portrays the soundproofing characteristics of this product, namely, the transmission loss ΔL in decibels, as a function of the frequency f in hz, or cycles per second.

EXAMPLE 2

Two plates, 5 mm. thick, made of wood particles agglomerated by a binder, known under the brand name "Novopan," are used, and between these plates is glued the intermediate layer of a thickness of 3 mm. and constituted in the same manner as in Example 1. The gluing between the layers is effected under pressure with an asphaltic adhesive. The acoustic insulating characteristics of this composite plate is portrayed by curve B in FIG. 2.

Figure 3:
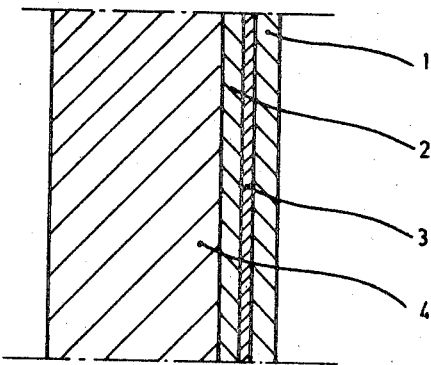
FIG. 3 is a sectional view of a composite structural assembly comprising a structural element in accordance with the invention combined with an insulating element, by being affixed to one side of the latter.

In FIG. 3 is shown a structural element or facing in association with an insulating element to constitute a structure according to the invention as set forth above. The facing, which has the physical characteristics defined above comprises two plates 1 and 2 and an intermediate layer 3. Plates 1 and 2, which may be of the same thickness, may be of plaster, with possibly a filler of sand, or of agglomerated particles of wood. The intermediate layer 3 may advantageously consist of a pad or mat of glass fibers as described above and may be constituted of glass fibers whose length is at length of the order of a decimeter and whose mean diameter is between about 10 and 40 microns, these fibers being interengaged in parallel planes and bound together by one or several elastomers such as natural or artificial latex in which are incorporated adjuvants, the percentage by weight of the binder being comprised between 20 and 50 percent of the total weight of the mat. Plates 1 and 2 may be integrated with the intermediate layer 3 by direct joining by a wet process or by casting, particularly in the case where the plates 1 and 2 are of plaster. They may also be made integral with the intermediate layer by gluing, particularly in the case where they are constituted of agglomerated wood particles.

Figure 4:
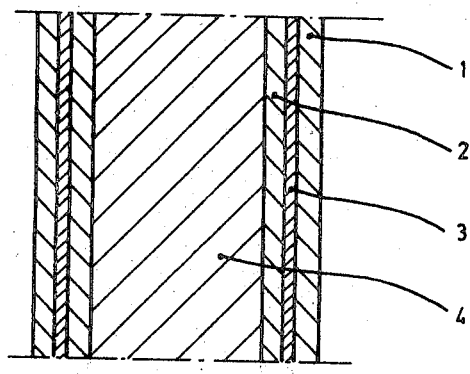
FIG. 4 is a sectional view similar to FIG. 3 with the structural element applied to the opposite sides of the fibrous, porous, or cellular insulating element.

The insulating element 4 may have a facing on only one of its surfaces as shown in FIG. 3, or on both of its outer surfaces as shown in FIG. 4.

Figure 5A:
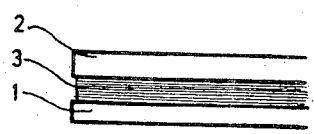
FIG. 5 is a graph of comparative curves showing the advantages of using the structural elements or facings in accordance with the invention in conjunction with a slab of sound insulating material, and portraying the soundproofing characteristics of the structural arrangements shown in FIGS. 5a and 5b.
Figure 5B:
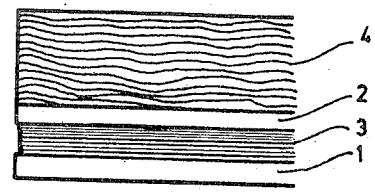
Figure 5:
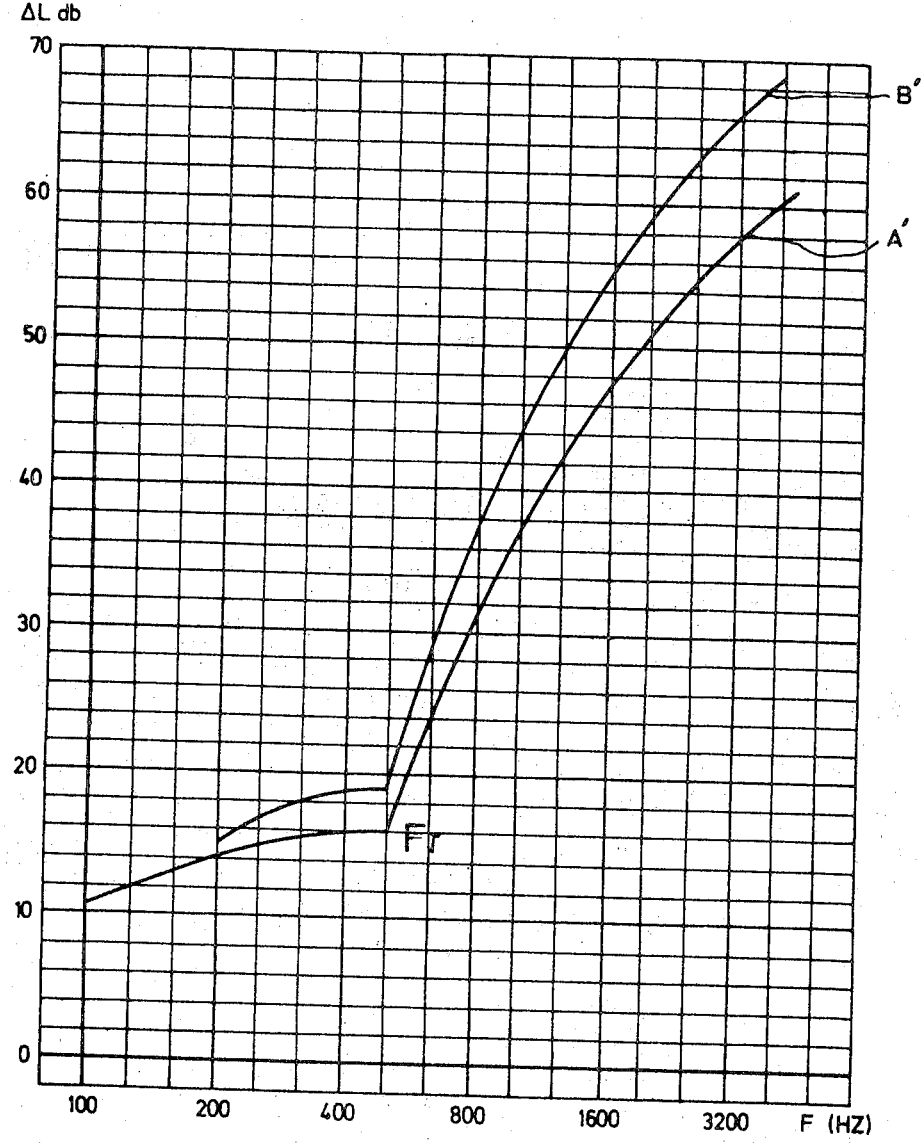

The graphs A' and B' in FIG. 5 are comparative portrayals of the soundproofing characteristics of the two structural assemblies shown in FIGS. 5a and 5b, respectively. In FIG. 5a, the structural element or facing is used alone, while in FIG. 5b, the facing is used in conjunction with the fibrous insulating layer 4. In both instances, the thickness of the plates 1 and 2 of plaster are 5 mm., and the thickness of the intermediate layer 3, formed of a fiber pad as disclosed in U.S. Pat. No.

3,658,633, is 3 mm. The thickness of the fiber insulating element 4 is 35 mm.

The curves A' and B' clearly show the improvement in acoustical insulation resulting from the product shown in FIG. 5b. In particular, it is shown that the resonance frequency $f_r$, is displaced upwards in curve B', and that the transmission loss is clearly higher for the same frequencies values.

Figure 6A:
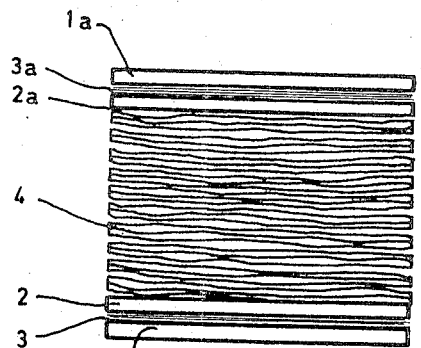
Figure 6:
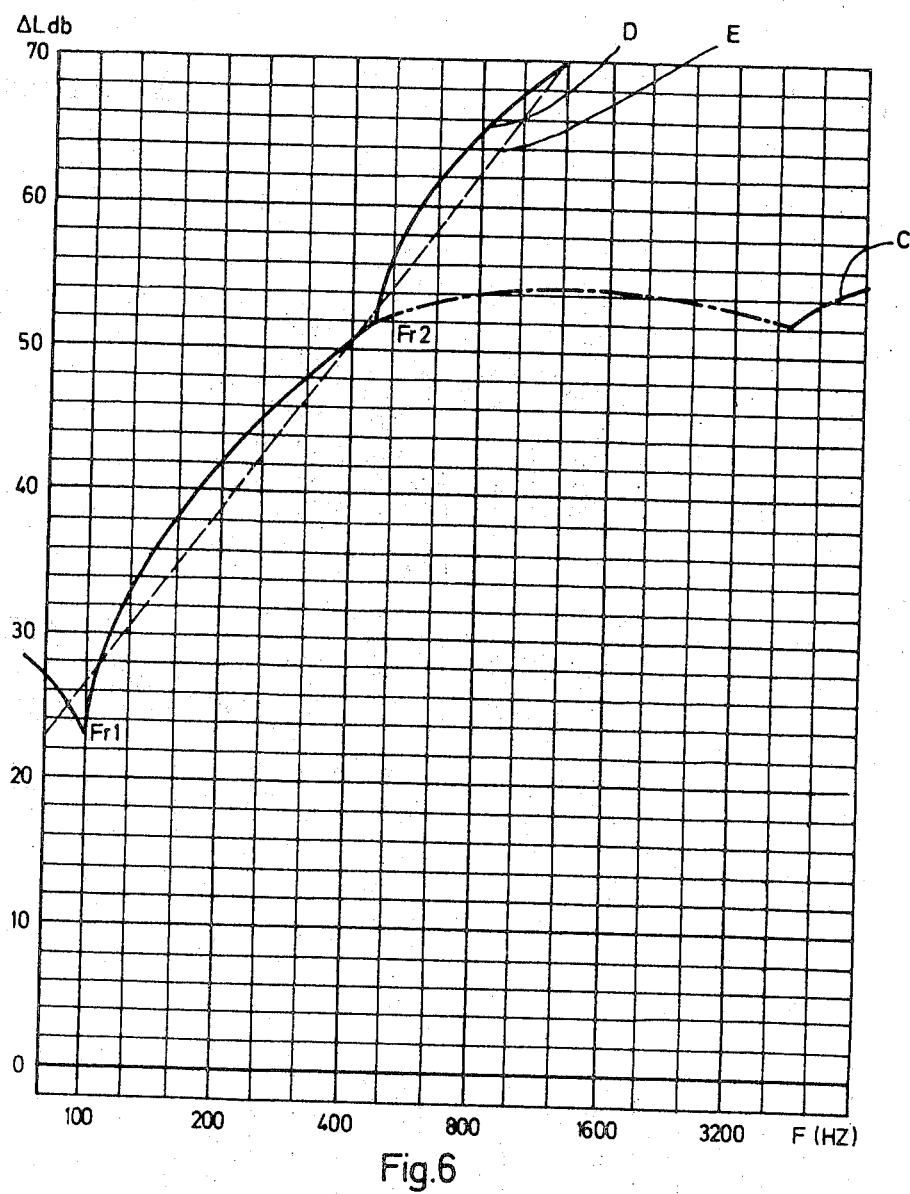

The graphs of FIG. 6 show curve C, representing the transmission loss of an insulating element of fibers 100 mm. thick, without a facing according to the invention, and curve D portraying the soundproofing characteristics of a structural assembly according to the invention as illustrated in FIG. 6a, which comprises the same insulating element 4 associated with two facings 1, 2, 3, and 1a, 2a, 3a according to the invention, each of these two facings being constituted by two plaster plates 5 mm. thick and an intermediate glass fiber mat 3 mm thick. On these graphs are shown two resonance frequencies $Fr_1$ and $Fr_2$, the frequency $Fr_1$ due to the insulating element 4 between the facings, and frequency $Fr_2$ due to the presence of the two facings. Between $Fr_1$ and $Fr_2$, curves C and D are practically merged. Starting from frequency $Fr_2$, the part of curve D, resulting from the presence of the two facings, follows the slope of the first part between $Fr_1$ and $Fr_2$. The straight line E on this graph shows the general trend of improvement in acoustic insulation attributable to the element shown in FIG. 6a, having a slope corresponding to 10 to 20 decibels per octave.

Figure 7B:
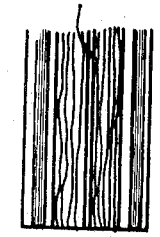
FIG. 7 is a graph of comparative curves portraying the acoustic improvements attainable by applying the inventive composite facings to the opposite sides of an insulating slab which includes an intermediate air layer, when the resultant structural assemblies are of the same thickness, as shown in FIGS. 7a and 7b.
Figure 7A:
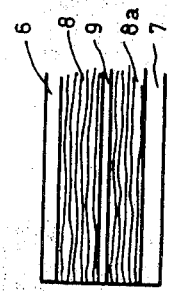
Figure 7:
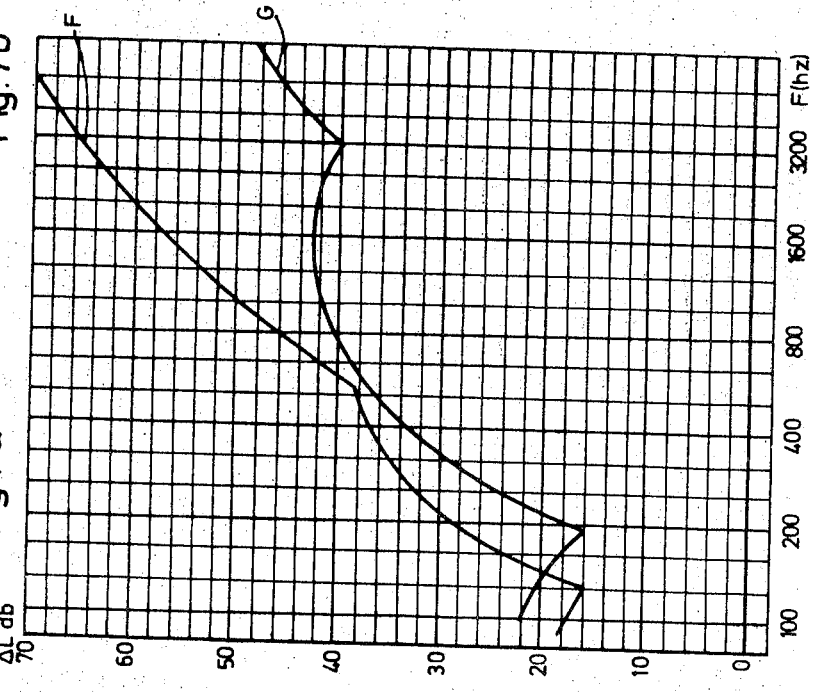

As indicated above, the insulating element can be constituted by two members separated by a sheet of air 5 as shown in FIG. 7a. Curve F, in FIG. 7, portrays the acoustic insulating characteristics of a structure according to the invention comprised of two facings of 5 mm. thickness, the outer plates of which are composed of plaster with the intermediate layer of 3 mm. thickness constituted by a pad of fibers according to the disclosure in U.S. Pat. No. 3,658,633. Between these facings is provided an insulating assembly of fibers constituted by two parts of 12 mm. in thickness separated by a layer of air 5 of 5 mm. thickness. Curve G, in FIG. 7, portrays the acoustic characteristics of a structure having no facings according to the invention, and which is constituted of two surface layers 6, 7 of plaster 10 mm. thick, and an insulating element of fibers formed by two members 8, 8a of 12 mm. each, separated by a layer of air 9 of 11 mm. thickness. The total thickness of this structure is 55 mm., that is, the same as that of the structure of FIG. 7a. These comparative curves show the increase in acoustic insulation resulting from the structures in accordance with the invention.

Figure 8B:
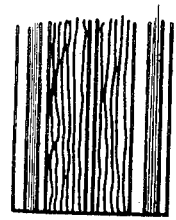
FIG. 8 is a graph of comparative curves similar to FIG. 7, portraying the advantages resulting from the application of the inventive composite facings to insulating assemblies of the same thickness, as shown in FIGS. 8a and 8b.
Figure 8A:
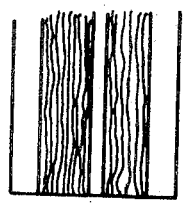
Figure 8:
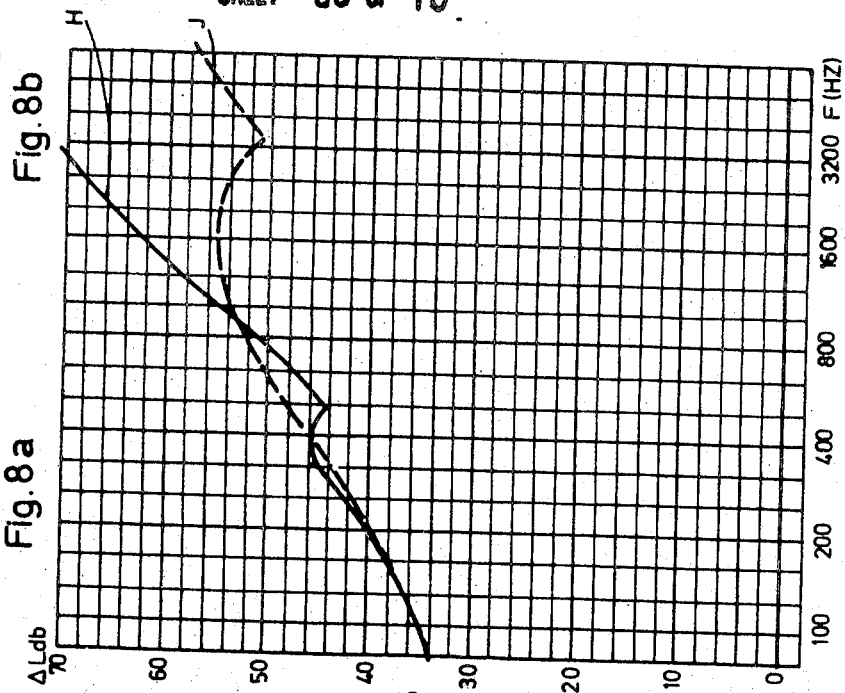

Curves H and J in FIG. 8 portray, respectively, the characteristics of a structural assembly with facings according to the invention as illustrated in FIG. 8a, in comparison with one having no such facings as shown in FIG. 8b. The surface elements of the facings comprised in these structures are of the same nature and same thickness as the surface elements in the embodiments shown in FIGS. 7a and 7b. Only the thickness of the insulating central fibrous element is different. According to the arrangement of the structure of FIG. 8a, the insulating element is constituted by two parts 35 mm. thick separated by a 4 mm air space. The structure of FIG. 8b comprises two insulating elements 35 mm. thick separated by a 10 mm. air space.

Curves K and L in FIG. 9 portray, respectively, the soundproofing characteristics of a structural assembly with facings according to the invention as illustrated in FIG. 9a in comparison with one not having such facings as shown in FIG. 9b. The thickness of the constituent elements are the same, respectively, as in the embodiments of FIGS. 8a and 8b. The insulating element 41, as well as insulating element 8 are also of fibers. The difference between them resides in the compositions of the outer facings in FIG. 9a, which are in accordance with the invention, while the exterior layers 6, 7 of the structural assembly in FIG. 9b are of agglomerated wood particles.

The graphs of FIG. 10 portray the acoustic insulating characteristics of structures embodying an insulating element of polystyrene, these structures being shown in FIGS. 10a and 10b. According to FIG. 10a, the structure comprises two facings in accordance with the invention, each composed of two 5 mm. outer plaster plates and a central layer of fibers of 3 mm. thickness, the assembly having a total thickness of 100 mm. According to FIG. 10b, the structure has two exterior layers of 10 mm. plaster and an interior insulating element of 80 mm. Curve M portrays the characteristics of the structure according to FIG. 10b with the use of a polystyrene layer, the density of which is about 5 kg. per cubic meter. Curve P portrays the characteristics of the structure shown in FIG. 10a which embodies facings in accordance with the invention and whose central insulating element is also constituted by a polystyrene board of 5 kg. per cubic meter density.

The following procedures are illustrative of modes of execution of the invention described above.

Figure 11:
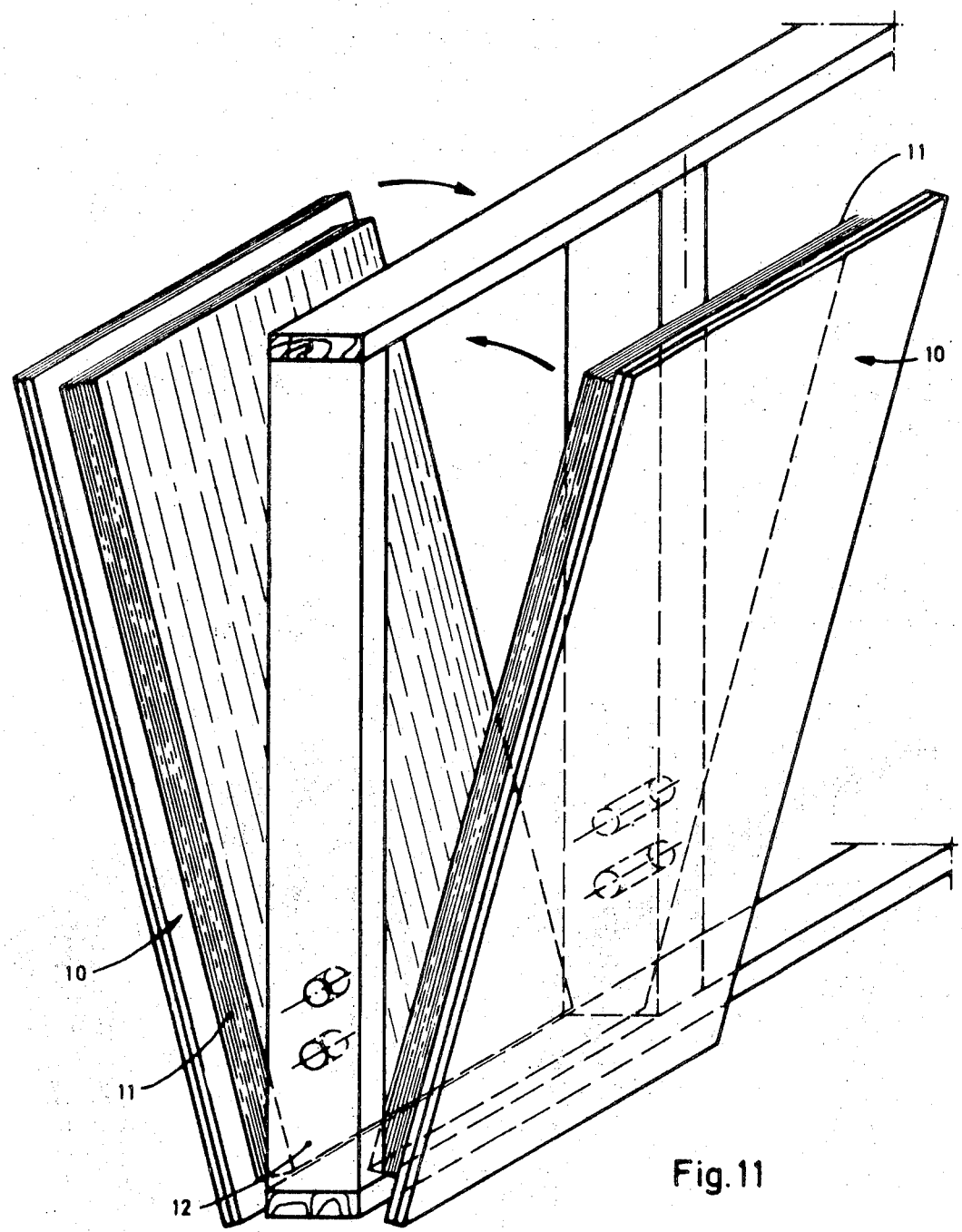
FIG. 11 is a perspective view of a frame for mounting a pair of semi-partitions each constituted by the inventive structural facing and an insulating slab connected thereto.

FIG. 11 shows, in perspective, the installation of a wall partition by means of two half-partitions each comprising a facing 10 according to the invention and an insulating element 11, these two half-partitions being mounted in a framework 12.

Figure 12:
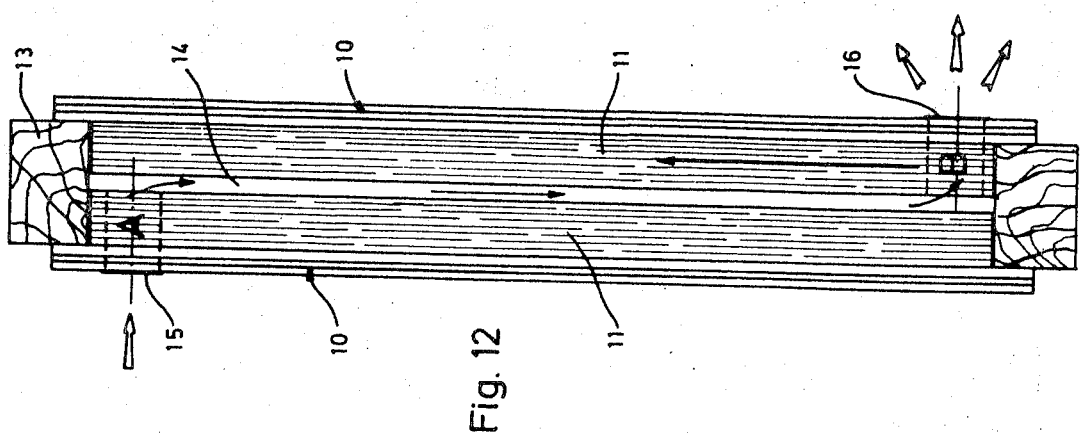

FIG. 12 shows two half-partitions assembled on a framework 13 and leaving between them a space 14 in which air can circulate, without causing loss of insulation, through a wide opening or unrestricted passage in the partition. This circulation can be established between an inlet ventilator 15 and a diffuser outlet ventilator 16.

Figure 13:
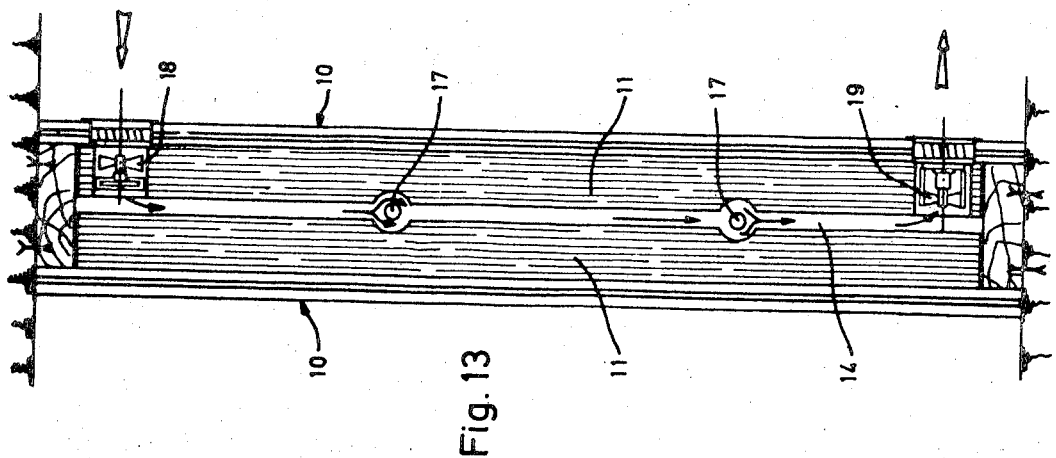

FIG. 13 also shows two half-partitions with a space 14 in which are placed pipes 17 carrying a hot or cold liquid. The passage of these pipes between the half-partitions prevents all noise problems, i.e., the noises of expansion of the pipes or tubes are diminished, which is also true of the circulating noises of the fluid. In addition, these pipes are thermally insulated.

Also, as shown in FIG. 13, a forced air flow in space 14 can be established by means of ventilators 18 and 19. Since the two ventilators are positioned on the same half-partition, air may be made to circulate around hot pipes or extra flat radiators, to heat one room without heating the room on the other side of the partition. Also, two adjacent rooms may be heated by disposing one ventilator on one half-partition and the other on the other half-partition.

FIG. 14 illustrates the flexible mounting of fixtures, such as, for example, wash basin 20 and toilet tank 21, on one of the half-partitions. This installation is accomplished by means of threaded bolts and nuts extending through a small plate 22 resting on the fibrous or cellular material of one of the half-partitions, the other half-partition being installed subsequently.

As shown in FIG. 15, the space between two half partitions can, in certain areas, be enlarged to permit pipes 25 or cables 26 to be positioned in the chambers 23, 24, resulting from said enlargements.

Since the installation of the facings on framework 27 is accomplished by screwing, it is possible to use metal caps or covers 28, which avoid crushing of the facings at the time of screwing, as shown in the detailed drawing in FIG. 16. According to one variant shown in FIG. 17, recessed channels 29 may be used.

Instead of disposing cables 26 in the space between the half-partitions, they may be positioned exteriorly in a duct 30 provided with a channel 31 (FIG. 18).

The structure according to the invention may be used as a partition or similar construction element. It can be utilized to line a wall which by itself is not, or is insufficiently, insulated from an acoustical point of view. The gain in sound insulation in the case of a lined wall, by the arrangement similar to the structure described with reference to FIG. 5b, for frequencies above 200 HZ, and for a wall of surface weight of 70 kg. per square meter, is of the order of 20 decibels.

The structures sound-proofed according to the invention are capable of very wide applications; they can be used for building, insulation of machines, insulation of vehicles, etc. It should be well understood in this matter, that by the term "structural element" is meant any soundproof element complying with the characteristics of the invention, whatever its field of application.

I claim:

1. A composite structural element, particularly useful for partition walls, having highly improved sound proofing characteristics, comprising
   a. outer rigid plates with an intermediate layer of resilient fibrous materials therebetween,
   b. said intermediate layer having a Young's modulus which is less than that of the rigid plates, being of a thickness no greater than 15 mm., and having a resistance to flow in excess of 20 Rayleigh,
   c. the thickness of the rigid plates in meters being less than $15/C_L$, where $C_L$ is the speed, in meters per second, of the longitudinal waves in the material of which said rigid plates are formed, and
   d. the shear modulus of the composite structural element being substantially equal to that of the intermediate layer.

2. A product as set forth in claim 1, wherein said outer rigid plates are formed of agglomerated wood particles with a binder, said plates being glued to the opposite sides of said intermediate layer.

3. A product as set forth in claim 1, wherein said rigid plates are formed of metal, which are glued to the opposite sides of said intermediate layer.

4. A product as set forth in claim 1, wherein said intermediate layer is in the form of a mat of fibrous material.

5. A product as set forth in claim 4, wherein the mat is formed of glass fibers agglomerated by a binder.

6. A product as set forth in claim 4, wherein the mat is formed of organic fibers.

7. A product as set forth in claim 4, wherein the mat is formed of organic fibers agglomerated by a binder.

8. A product as set forth in claim 4, wherein the mat is formed of a mixture of mineral and organic fibers.

9. A product as set forth in claim 4, wherein the mat is formed of a mixture of mineral and organic fibers agglomerated by a binder.

10. A product as set forth in claim 4, wherein the fibers of the mat are agglomerated by an elastomer.

11. A product as set forth in claim 5, wherein the glass fibers have a length of at least of the order of a decimeter, and of a diameter between about 10 to 40 microns, these fibers being entangled in parallel planes and joined together by one or more elastomers constituted by natural or artificial latex, the percentage in weight of the binder being between 20 and 50 percent of the total weight of the mat.

12. A product as set forth in claim 11 wherein the intermediate layer is fibrous material with the outer rigid plates adhesively affixed to the opposite sides of the former, said sides adapted to have the outer pores thereof blocked, at least partially, to prevent the migration of the adhesive to the interior of the layer.

13. A product as set forth in claim 4, wherein the mat is formed of mineral fibers agglomerated by a binder.

14. A product as set forth in claim 13, wherein the mineral fibers are agglomerated by a thermoplastic resin foam.

15. A product as set forth in claim 4, wherein the fibrous mat is reenforced by transverse needling.

16. A product as set forth in claim 1, including an insulating member of substantial thickness with gaseous spaces interspersed therethrough, affixed thereto.

17. A product as set forth in claim 16, wherein one of the rigid plates of the composite structural element is integrally cast to the insulating member.

18. A product as set forth in claim 16, wherein one of the rigid plates of the composite structural element is adhesively applied to a face of the insulating member.

19. A product as set forth in claim 16, wherein the insulating member is composed of a polystyrene foam of low specific density.

20. A product as set forth in claim 19, wherein the insulating member is formed of expanded pearls of polystyrene which have been reheated to the softening temperature which is followed by compressing the layer of pearls to the desired thickness and density and cooling the layer while subjecting it to sufficient pressure to maintain its thickness.

21. A product as set forth in claim 20, wherein the initially expanded pearls of polystyrene are derived from pre-expanding granules of polystyrene containing a blowing agent, by heating with steam at atmospheric pressure, followed by conditioning and treating with steam in a confined space.

22. A product as set forth in claim 20, wherein the initially expanded pearls of polystyrene are derived from prehating granules of polystyrene containing a blowing agent by air at a temperature in excess of 90° C. to 100°C., followed by the treatment of these granules with steam.

23. A product as set forth in claim 19, wherein the polystyrene foam is compressed and then treated with steam.

24. A product as set forth in claim 19, wherein the polystyrene foam of low specific density ranges from approximately 5 kg. to 6 kg. per cubic meter.

25. A product as set forth in claim 1, including an insulating core member of substantial thickness with gaseous spaces interspersed therethrough, said product being affixed to the opposite sides of said core member.

26. A product as set forth in claim 25, wherein one of the rigid plates of each composite structural element is cast integrally to one face of the insulating core member.

27. A product as set forth in claim 25, wherein one of the rigid plates of each composite structural element is adhesively applied to one face of the insulating core member.

28. A product as set forth in claim 27, wherein the insulating core member includes an air space in the interior thereof.

29. A product as set forth in claim 28, wherein the air space in the interior of the insulating core member is maintained by uniformly distributed spacing blocks between the inner surfaces of spaced portions of said core member.

30. A product as set forth in claim 28, wherein said insulating core member is divided in two portions on the opposite sides of said air space with the composite structural element on the outer face of each portion, and framing means for mounting both portions of the assembly.

31. A product as set forth in claim 28, including means for establishing a circulation of the air within the air space on the interior of said insulating core member.

32. An assembly as set forth in claim 30, including blowing means for circulating air through the air space between the two portions of the core member.

33. An assembly as set forth in claim 30, including conduits mounted in said framing means extending through said air space.

34. An assembly as set forth in claim 30, including a reinforcing plate on the inner face of one of said portions of said insulating core member in said air space, and fastening means extending through said plate and last-mentioned portion adapted to mount fixtures on the other face of the structural element of said portion.

35. A product as set forth in claim 1, wherein the resistance of flow of said intermediate layer is at least 60 Rayleigh.

36. A product as set forth in claim 1, wherein the shear modulus of the intermediate layer is at least equal to the modulus of elasticity thereof and preferably exceeds the modulus of elasticity thereof up to ten times the latter.

37. A product as set forth in claim 1, wherein the thickness of each rigid plate is approximately $10/C_L$.

38. A product as set forth in claim 37, wherein said outer rigid plates are formed of plaster adhering directly to the intermediate fibrous layer.

39. A product as set forth in claim 37, wherein said outer rigid plates are formed of plaster with an addition of sand, adhering directly to the intermediate fibrous layer.

* * * * *

UNITED STATES PATENT OFFICE
CERTIFICATE OF CORRECTION

Patent No. 3,822,764     Dated July 9, 1974

Inventor(s) MARCEL MARIE ANTOINE VAL

It is certified that error appears in the above-identified patent and that said Letters Patent are hereby corrected as shown below:

Claim 1, column 9, line 37, "materials" should read --material--.

Claim 28, column 11, line 12, "27" should read --25--.

Signed and sealed this 29th day of October 1974.

(SEAL)
Attest:

McCOY M. GIBSON JR.
Attesting Officer

C. MARSHALL DANN
Commissioner of Patents